Figure 1:
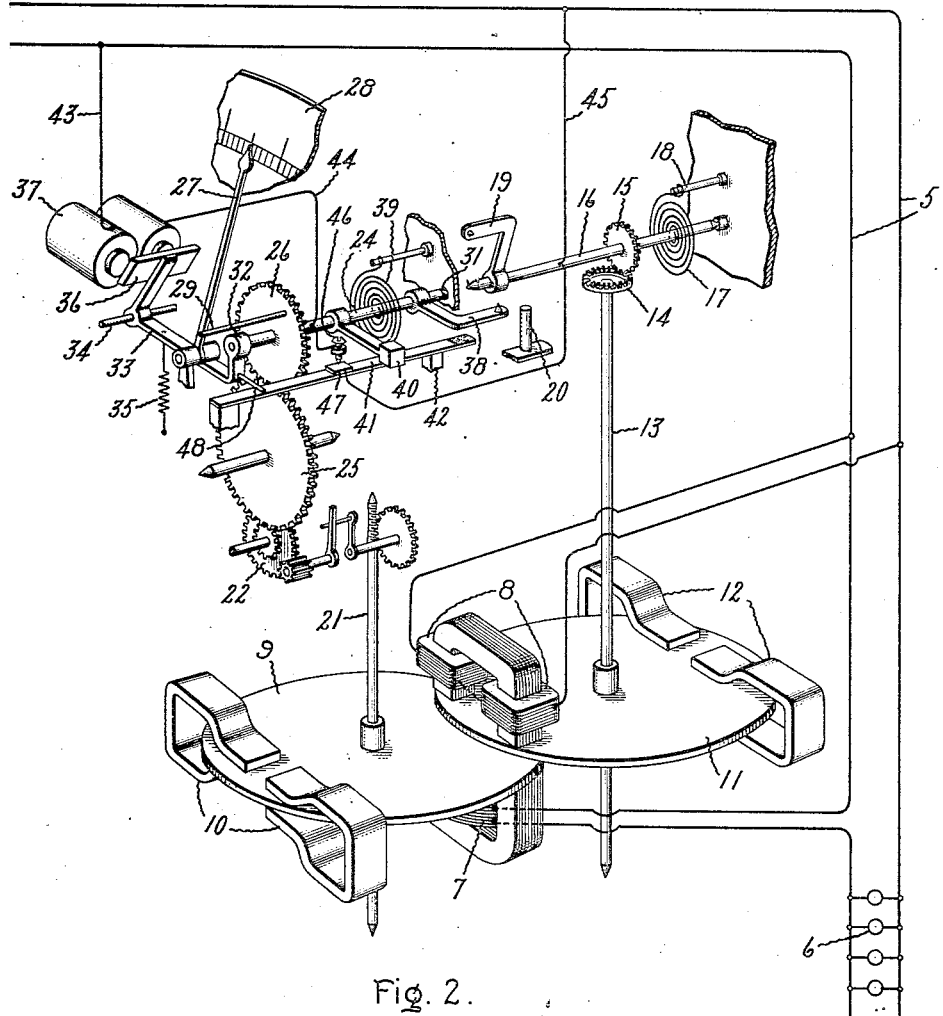

L. T. ROBINSON.
MAXIMUM DEMAND INDICATOR.
APPLICATION FILED MAY 22, 1913.

1,118,444.

Patented Nov. 24, 1914.

Witnesses:
George H. Tilden
J. Ellis Glen

Inventor:
Lewis T. Robinson,
by Albert G. Davis
His Attorney.

UNITED STATES PATENT OFFICE.

LEWIS T. ROBINSON, OF SCHENECTADY, NEW YORK, ASSIGNOR TO GENERAL ELECTRIC COMPANY, A CORPORATION OF NEW YORK.

MAXIMUM-DEMAND INDICATOR.

1,118,444.  Specification of Letters Patent.  Patented Nov. 24, 1914.

Application filed May 22, 1913. Serial No. 769,168.

*To all whom it may concern:*

Be it known that I, LEWIS T. ROBINSON, a citizen of the United States, residing at Schenectady, in the county of Schenectady, State of New York, have invented certain new and useful Improvements in Maximum-Demand Indicators, of which the following is a specification.

My invention relates to maximum demand indicating instruments, and in particular to instruments which indicate the maximum demand made by an electrical installation upon a central generating station or other source of electric energy supply.

A modern problem of considerable importance in the distribution of electrical energy to individual consumers is to determine the tariff rate which should be charged each consumer for the energy he uses. One method of determining this tariff rate for electrical energy which is regarded with considerable favor consists in basing the rate upon the maximum demand made by the consumer's installation upon the central generating plant. A determination or measurement of the maximum demand is obviously necessary where this method of charging is in vogue. Contracts in which the maximum demand is made the basis for the tariff rate usually provide a certain agreed rate when the maximum demand is between predetermined limits, and a different rate when the maximum demand is between other limits. Where this method of determining the tariff rate is employed, an instrument is required which will accurately measure and record the greatest or maximum demand made by the installation, and in a manner satisfactory to the consumer and to the central station management.

My invention contemplates a novel construction of instrument particularly adapted to measure the maximum demand and possessing characteristics which render such measurement acceptable to both the consumer and the central station.

The object of my invention is to provide a novel and improved construction of maximum demand indicator.

More specifically, the object of my invention is to provide a simple, inexpensive and compact construction of maximum demand indicator which can be economically supplied to consumers using only small quantities of energy.

A further object of my invention is to provide a novel construction of maximum demand indicator whose operative elements can be actuated entirely by the field coils of a wattmeter, and whose indications are of sufficient accuracy for all practical purposes.

The novel and patentable features which I believe to be characteristic of my invention are indicated in the claims appended hereto.

The construction and mode of operation of a maximum demand indicator embodying my invention will be understood by reference to the following description taken in connection with the accompanying drawings, in which:—

Figure 2:
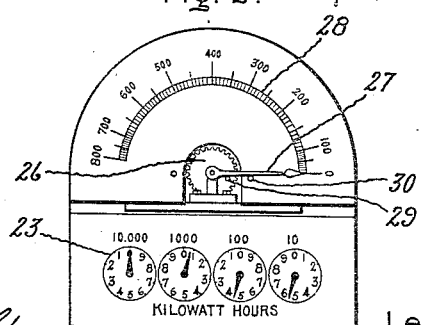

Figure 1 is a diagrammatic view in perspective of my novel and improved maximum demand indicator embodied in a wattmeter of the induction type, and operatively connected to an electrical installation, and Fig. 2 is an elevation of a portion of my improved indicator showing the scale of the integrating watthour meter and the maximum demand scale.

Referring to Fig. 1 of the drawings, there is shown a system of distribution comprising conductors 5 supplying electric energy to translating devices 6. A watthour meter of the induction type is operatively connected to the system in the usual manner for the purpose of integrating and registering the total quantity of energy consumed in the translating devices. The induction wattmeter comprises the usual series coil 7 and potential coils 8 which produce a shifting magnetic field proportional to the instantaneous rate of consumption of energy in the well understood manner.

Two rotatable disk armatures are located within the influence of the magnetic field produced by the coils 7 and 8. One of these disk armatures 9 is arranged as the rotatable element of a watthour meter. Permanent magnets 10 are mounted in operative relation to the disk armature 9, so that the revolutions of the armature are directly proportional to the watthours of energy consumed in the translating devices. The second armature 11 is arranged as the movable element of an indicating wattmeter. Permanent magnets 12 are operatively associated with the indicating wattmeter armature 11.

A shaft 13 is rigidly secured to the indicating wattmeter armature 11 and carries at its upper end a gear member 14. The gear member 14 operatively engages a gear 15 rigidly secured to a shaft 16. A control spring 17 is operatively connected at one end to the shaft 16 and at the other end to a fixed part 18 of the instrument. The control spring is designed to render the movement of the disk armature 11 a measure of the strength of the magnetic field, and thus a measure of the instantaneous rate of consumption of energy.

An L shaped contact member 19 is rigidly secured to the shaft 16, and, due to the action of the control spring 17, normally engages with a fixed stop 20 when no energy is being consumed in the translating devices. The engagement of the contact member 19 with the fixed stop 20 determines the zero or initial position of the armature of the indicating wattmeter element. When energy is being consumed in the translating devices, the contact member is moved by the shaft 16 and always occupies a position whose distance from the initial position, determined by the fixed stop 20, is a measure of the instantaneous rate of consumption of energy in the installation. It will thus be seen that the movable contact member 19 corresponds to the indicating pointer of an ordinary indicating wattmeter.

A shaft 21 is rigidly secured to the rotatable disk 9 of the watthour meter element. The shaft 21 drives, through gearing 22, the usual registering mechanism of the meter. This mechanism has been omitted in Fig. 1 of the drawing, but the register dial 23 operatively connected to the shaft 21 and gearing 22, is shown in Fig. 2 of the drawings.

The rotatable shaft 21 of the watthour meter is arranged to drive a shaft 24 by means of the gearing 22 and intermeshing gears 25 and 26. The gear 26 performs the function of an actuator to drive a non-return pointer 27 across a suitable scale 28. This is accomplished by means of a pin 29 secured to the actuator gear 26 and arranged to engage the non-return pointer 27. The zero position of the non-return pointer is determined by a fixed pin 30, shown in Fig. 2 of the drawings.

One end of the shaft 24 is pivoted at 31 to a fixed portion of the instrument, while the other end of this shaft is pivoted at 32 to one end of a lever arm 33. The lever arm is fulcrumed about a pin 34 and is normally maintained, by means of the spring 35, in such a position that gear 25 operatively engages the actuator gear 26. The armature 36 of a pair of coöperating electromagnets 37 is secured to the other end of the lever arm 33. The arrangement of the armature 36 and lever arm 33 is such that when the electromagnet 37 is energized the pivot 32 of shaft 24 is elevated and the actuator 26 is disconnected from operative engagement with the watthour meter driven gear 25.

An L shaped contact member 38 is rigidly secured to the shaft 24 and is accordingly moved when the shaft 24 is driven by the watthour meter. The contact portion of the contact member 38 is arranged to move in substantially the same path as the contact portion of the contact member 19. If the zero or initial position of the contact member 38 is substantially the same as that of the contact member 19, the distance that the contact member 38 moves from its initial position to engagement with the contact member 19 is a measure of the instantaneous rate of consumption of energy at the instant of contact between these members.

A control spring 39 is operatively secured between the shaft 24 and a fixed part of the instrument, and tends to return the actuator 26 to an initial position when the operative connection between the actuator and the watthour meter is interrupted. This initial position is determined by a weight 40 which engages with a spring member 41, whose downward movement is limited by a fixed stop 42.

One terminal of the winding of electromagnet 37 is connected by conductor 43 to one side of the distribution system 5. The other terminal of the winding of the electromagnet is connected by conductor 44 to the shaft 24. The shaft 16 is connected by conductor 45 to the other side of the distribution system 5. When contact member 38 engages with contact member 19, the electric circuit through the electromagnet is completed and the magnet is energized. The armature 36 is thereby attracted, and the actuator 26 raised from engagement with gear 25. A fixed auxiliary contact 46 is electrically connected to the shaft 24, and a coöperating movable contact 47 is electrically connected to the shaft 16. The auxiliary contacts 46 and 47 are thus arranged in shunt relation to the main movable contacts 19 and 38. The movable auxiliary contact 47 is mounted on the spring member 41, and the action of this spring member tends to maintain the auxiliary contacts in engagement. When the weight 40 rests upon the spring member 41 the engagement of these contacts is broken. Furthermore, when the electromagnet 37 is deënergized, a pin 48, secured to the lever 33, is arranged to coöperate with the spring member 41 and hold the contacts 46 and 47 disengaged.

The operation of my improved maximum demand indicator is as follows: When electric energy is being consumed in the translating devices 6, a shifting magnetic field will be produced by the field coils 7 and 8, resulting in rotation of the watthour meter armature 9 and a turning of the indicating watthour armature 11 until its torque is counter-balanced by the torque of the control spring 17. The movable contact member 19 will, therefore, take up a position whose distance from the initial position of the member is a measure of the instantaneous rate of consumption of energy in the translating devices. The movable contact member 38 will be driven by the watthour meter armature 9, gearing 22, gear 25 and actuator 26 toward the contact member 19. When the movable contact member 38 engages with contact member 19, it will have moved from its initial position a distance which is a measure of the instantaneous rate of consumption of energy at the moment of engagement of the contact members. When the contact members engage, the electromagnet 37 is energized and the actuator 26 is raised from operative connection with the gear 25. At the same time the pin 48 is raised, and the auxiliary contacts 46 and 47 come into engagement, due to the action of the spring member 41. The actuator is now free to return to its initial position under the influence of the spring 39. The instant before the actuator reaches its initial position, the weight 40 falls upon the spring member 41 and disengages the auxiliary contacts 46 and 47. The electromagnet 37 is thereby deënergized and the actuator drops into operative engagement with the gear 25. At the same time, pin 48 engages with the spring member 41 and maintains the auxiliary contacts disengaged.

It will be observed that as soon as the actuator starts to return to its initial position the main contact members 38 and 19 are disengaged, and hence it is necessary to provide the auxiliary contacts 46 and 47 to maintain the electromagnet energized, and consequently the actuator 26 operatively disconnected from the gear 25 until the actuator has returned to its initial position. The pin 29 of the actuator engages with the non-return pointer 27 and moves this pointer across the scale 28. The pointer will therefore, indicate the maximum movement of the actuator from its initial position to the position of engagement of the contact members 38 and 19.

When the translating devices 6 are cut out of circuit no energy is being consumed or metered and consequently the indicating wattmeter armature 11 is returned to its initial position by the spring 17. The contact member 19 then moves toward the contact member 38 and when these contacts engage the actuator is returned to its initial position as hereinbefore described. The initial or zero position of the contact member 38 is such that this member is slightly below and out of engagement with the contact member 19 when the latter rests on its stop 20.

As long as no energy is being consumed in the translating devices all of the operative elements of the indicator are held in their respective initial positions. Furthermore, all operative elements of the indicator return to their initial positions as soon as the consumption of energy in the translating devices is interrupted. This is a particularly important advantage of my improved maximum demand indicator, as the indicator is always in readiness to begin a measurement of the demand as soon as the consumption of energy begins in the translating devices. Thus the beginning of an interval of measurement of demand is always coincident with the beginning of the consumption of energy.

I have hereinbefore stated that the movable contact member 38 and the actuator 26 are returned to their respective initial positions when the distance these members have moved from their initial positions is a measure of the instantaneous rate of consumption of energy. This condition is obviously fulfilled only when the initial positions of the contact members 19 and 38 are substantially the same, as shown in the preferred embodiment of my invention herein illustrated. It will be evident to those skilled in the art that under certain conditions it may not be desirable to have the initial positions of these contact members substantially the same. For example, the initial position of the movable contact member 38 may, under certain circumstances, be some distance behind or below the initial position of the movable contact member 19. In any case the distance the movable contact member 38 moves from its initial position before engaging with the contact member 19 will be some predetermined and definite function of the instantaneous distance of the contact member 19 from its initial position. In other words when the actuator 26 occupies a position with respect to a suitable scale of reference, as for example the scale 28, which is a measure of the rate of consumption of energy, or some predetermined function thereof, at that particular instant, the operative connection between the actuator and the watthour meter element will be interrupted, and the actuator returned to its initial position.

The measurements obtained with my maximum demand indicator are in substance periodical measurements of the instantaneous rate of energy consumption. In other words, I obtain measurements of the rate of consumption of energy at particular instants. By the improved construction of my indicator these measurements are made in such a manner that the consumption of energy must continue at the rate recorded for an appreciable and sufficient interval of time before a measurement of such rate of energy consumption is obtained. A permanent indication is obtained of the maximum rate of energy consumption so measured.

The time interval between the measurements of demand in my indicator are of secondary importance and the only prerequisite in regard to this interval is that it be of sufficient duration to insure a measurement of demand which is fair to the consumer and acceptable to the central generating station. The time intervals between the interruptions of the operative connection of the actuator and the watthour meter element, and hence the time intervals between measurements of demand, will be equal if the rate of consumption of energy remains uniform. Furthermore, if the rate of consumption of energy remains uniform while the actuator is moving from its initial position to engagement with the movable member of the indicating wattmeter element, the time intervals will be equal, regardless of the rate of consumption of energy during each separate interval. Such conditions, however, are not at all likely to prevail in actual practice, and the time interval of my indicator is therefore, indefinite. As previously mentioned, however, the real function of the time interval is to give the indicator a time lag so that the consumer will not be penalized for temporary overloads, such as short circuits.

My maximum demand indicator measures the instantaneous rate of consumption of energy in such a manner that this rate must continue for an appreciable length of time before the measurement will be made. It will accordingly be evident that in some cases the return of the actuator 26 to an initial position each time that the movable contact members 38 and 19 engage may be unnecessary, since it is only desired to interrupt the movement of the actuator 26 when it occupies a position with respect to the indicating elements of the instrument which is a measure of the instantaneous rate of consumption of energy.

It will be observed from the foregoing description that I have provided a construction of maximum demand indicator which is simple, compact and inexpensive to manufacture. The instrument is, furthermore, of sufficient accuracy to meet all practical operative requirements, and is acceptable to both the consumer and the central generating station. All of the operative elements of the indicator are actuated by the field coils of the induction wattmeter. By this construction the constant speed clockwork mechanism which has heretofore characterized nearly all practical maximum demand indicators can be dispensed with, and thus, the cost of the indicator materially reduced. The instrument can, therefore, be manufactured at such a cost as to permit its use in installations where the consumption of energy is too small to warrant the use of the more expensive types of demand apparatus.

Numerous modifications in the details of construction of my improved maximum demand indicator will be evident to those skilled in the art. While I have described as the preferred embodiment of my invention an instrument of the induction type having all of its operative elements actuated by the same field coils, it will be obvious that my invention is not limited either to an instrument of this particular type or to an instrument in which the watthour meter element and the wattmeter element are actuated by the same field coils. I do not, therefore, desire to be limited to the specific construction which I have herein described and illustrated, and I aim by the terms of the appended claims to cover all modifications which are within the spirit and scope of my invention.

What I claim as new and desire to secure by Letters Patent of the United States, is:

1. A maximum demand indicator comprising in combination a watthour meter element, an indicating wattmeter element adapted to always occupy a position which is a measure of the instantaneous rate of consumption of energy, a movable member adapted to be actuated by said watthour meter element, means coöperating with said indicating wattmeter element for interrupting the movement of said movable member when said member occupies a position with respect to a suitable reference scale which is a measure of the instantaneous rate of consumption of energy, and means for indicating the maximum movement of said movable member.

2. A maximum demand indicator comprising in combination a watthour meter having field coils and a rotatable armature, an indicating wattmeter armature pivotally mounted in the magnetic field of said coils, a control spring operatively connected to said indicating wattmeter armature to render its movement a measure of the strength of the magnetic field, a movable member adapted to be actuated by said watthour meter armature, means coöperating with said indicating wattmeter armature for interrupting the movement of said movable member when said member occupies a position with respect to a suitable reference scale which is a measure of the instantaneous rate of consumption of energy, and means for indicating the maximum movement of said movable member.

3. A maximum demand indicator comprising in combination a watthour meter element, an indicating wattmeter element adapted to always occupy a position which is a measure of the instantaneous rate of consumption of energy, a movable member having an initial position and adapted to be actuated by said watthour meter element, means coöperating with said indicating wattmeter element whereby said movable member is returned to its initial position when said member occupies a position with respect to a suitable reference scale which is a measure of the instantaneous rate of consumption of energy, and means for indicating the maximum movement of said movable member.

4. A maximum demand indicator comprising in combination a watthour meter having field coils and a rotatable armature, an indicating wattmeter armature pivotally mounted in the magnetic field of said coils, a control spring operatively connected to said indicating wattmeter armature to render its movement a measure of the strength of the magnetic field, a movable member having an initial position and adapted to be actuated by said watthour meter armature, means coöperating with said indicating wattmeter armature whereby said movable member is returned to its initial position when said member occupies a position with respect to a suitable reference scale which is a measure of the instantaneous rate of consumption of energy, and means for indicating the maximum movement of said movable member.

5. A maximum demand indicator comprising in combination a watthour meter element, an indicating wattmeter element having an initial position and adapted to always occupy a position whose distance from said initial position is a measure of the instantaneous rate of consumption of energy, a movable member having an initial position and adapted to be actuated by said watthour meter element, means for interrupting the movement of said movable member when the distance said member has moved from its initial position is a predetermined function of the instantaneous distance of said indicating wattmeter element from its initial position, and means for indicating the maximum movement of said movable member.

6. A maximum demand indicator comprising in combination a watthour meter element, an indicating wattmeter element having an initial position and adapted to always occupy a position whose distance from said initial position is a measure of the instantaneous rate of consumption of energy, a movable member having an initial position and adapted to be actuated by said watthour meter element, means for returning said movable member to its initial position when the distance said member has moved from its initial position is a predetermined function of the instantaneous distance of said indicating wattmeter element from its initial position, and means for indicating the maximum movement of said movable member.

7. A maximum demand indicator comprising in combination a watthour meter having a rotatable shaft, a movable member having an initial position, means for operatively connecting said rotatable shaft to said movable member, means for interrupting the operative connection between said shaft and said member when the member occupies a position with respect to a suitable reference scale which is a measure of the instantaneous rate of consumption of energy, means for returning said movable member to its initial position each time the operative connection between said shaft and said member is interrupted, means for maintaining said shaft and said member operatively disconnected while the member is returning to its initial position, and means for indicating the maximum movement of said member.

8. A maximum demand indicator comprising in combination a watthour meter having field coils and a rotatable armature, an indicating wattmeter armature pivotally mounted in the magnetic field of said coils, a control spring operatively connected to said indicating wattmeter armature to render its movement a measure of the strength of the magnetic field, a movable member having an initial position, means for operatively connecting said wattmeter armature to said movable member, means coöperating with said indicating wattmeter armature for interrupting the operative connection between said watthour meter armature and said member when the member occupies a position with respect to a suitable reference scale which is a measure of the instantaneous rate of consumption of energy, means for returning said movable member to its initial position each time the operative connection between said watthour meter armature and said member is interrupted, means for maintaining said watthour meter armature and said member operatively disconnected while the member is returning to its initial position, and means for indicating the maximum movement of said movable member.

9. A maximum demand indicator comprising in combination a watthour meter having a rotatable shaft, a movable member having an initial position, means for operatively connecting said rotatable shaft to said movable member, means for interrupting the operative connection between said shaft and said member when the distance the member has moved from its initial position is substantially a measure of the instantaneous rate of consumption of energy, means for returning said movable member to its initial position each time the operative connection between said shaft and said member is interrupted, means for maintaining said shaft and said member operatively disconnected while the member is returning to its initial position, and means for indicating the maximum movement of said member.

10. A maximum demand indicator comprising in combination a watthour meter element and an indicating wattmeter element, a movable member having an initial position, means for operatively connecting said watthour meter element to said movable member, means coöperating with said indicating wattmeter element for interrupting the operative connection between said watthour meter element and said movable member when the distance the member has moved from its initial position is substantially a measure of the instantaneous rate of consumption of energy, means for returning said movable member to its initial position each time the operative connection between the watthour meter element and the member is interrupted, means for maintaining said watthour meter element and said member operatively disconnected while the member is returning to its initial position, and means for indicating the maximum movement of said movable member.

11. A maximum demand indicator comprising in combination a watthour meter having field coils and a rotatable armature, an indicating wattmeter armature pivotally mounted in the magnetic field of said coils, a control spring operatively connected to said indicating wattmeter armature to render its movement a measure of the strength of the magnetic field, a movable member having an initial position, means actuated by said watthour meter armature for driving said movable member, means coöperating with said indicating wattmeter armature whereby said movable member is returned to its initial position when the distance the member has moved from its initial position is substantially a measure of the instantaneous rate of consumption of energy, and means for indicating the maximum movement of said movable member.

12. A maximum demand indicator comprising in combination a watthour meter having field coils and a rotatable armature, an indicating wattmeter armature pivotally mounted in the magnetic field of said coils, a control spring operatively connected to said indicating wattmeter armature to render its movement proportional to the strength of the magnetic field, a movable member having an initial position, means for operatively connecting said watthour meter armature to said movable member, means coöperating with said indicating wattmeter armature for interrupting the operative connection between said watthour meter armature and said member when the distance the member has moved from its initial position is substantially a measure of the instantaneous rate of consumption of energy, means for returning said movable member to its initial position each time the operative connection between said watthour meter armature and said member is interrupted, means for maintaining said watthour meter armature and said member operatively disconnected while the member is returning to its initial position, and means for indicating the maximum movement of said movable member.

13. A maximum demand indicator comprising in combination a watthour meter having field coils and a rotatable armature, an indicating wattmeter armature pivotally mounted in the magnetic field of said coils, a control spring operatively connected to said indicating wattmeter armature to render its movement a measure of the strength of the magnetic field, a movable member having an initial position, means actuated by said watthour meter armature for driving said movable member, means coöperating with said indicating wattmeter armature for interrupting the movement of said movable member when the distance the member has moved from its initial position is substantially a measure of the instantaneous rate of consumption of energy, and means for indicating the maximum movement of said movable member.

14. A maximum demand indicator comprising in combination a watthour meter having field coils and a rotatable armature, an indicating wattmeter armature pivotally mounted in the magnetic field of said coils, a control spring operatively connected to said wattmeter armature to render its movement a measure of the strength of the magnetic field, a movable member having an initial position, means actuated by said rotatable watthour meter armature for driving said movable member, means for interrupting the movement of said movable member when the extent of its movement from its initial position is at any instant a predetermined function of the extent of movement of said indicating wattmeter armature from its initial position, and means for indicating the maximum movement of said movable member.

15. A maximum demand indicator comprising in combination an electric meter having field coils and a rotatable armature, an armature member pivotally mounted in the magnetic field of said coils, a spring operatively connected to said armature member and opposing its movement in response to the influence of said coils, a movable member having an initial position and adapted to be driven by said rotatable armature, means coöperating with said armature member for causing said movable member to be returned to its initial position when the extent of its movement therefrom is a predetermined function of the instantaneous rate of consumption of energy, and means for indicating the maximum movement of said movable member.

16. A maximum demand indicator comprising in combination a watthour meter element and an indicating wattmeter element, a movable member having an initial position operatively connected to said indicating wattmeter element and adapted to always occupy a position whose distance from said initial position is a measure of the instantaneous rate of consumption of energy, a second movable member having an initial position and adapted to be actuated by said watthour meter element, means for interrupting the movement of said second movable member when said second movable member has moved from its initial position a distance substantially equal to the instantaneous distance of said first-mentioned movable member from its initial position, and means for indicating the maximum movement of said second movable member.

17. A maximum demand indicator comprising in combination a watthour meter having field coils and a rotatable armature, an indicating wattmeter armature pivotally mounted in the magnetic field of said coils, a control spring operatively connected to said wattmeter armature to render its movement a measure of the strength of the magnetic field, a movable member adapted to be actuated by the indicating wattmeter armature, a second movable member having an initial position and adapted to move in substantially the same path as the first-mentioned movable member, means actuated by said rotatable watthour meter armature for moving said second movable member, means for interrupting the movement of said second movable member when said second movable member engages with said first-mentioned movable member, and means for indicating the maximum movement of said second movable member.

18. A maximum demand indicator comprising in combination a watthour meter element and an indicating wattmeter element, a movable member having an initial position operatively connected to said indicating wattmeter element and adapted to always occupy a position whose distance from said initial position is a measure of the instantaneous rate of consumption of energy, a second movable member having an initial position and adapted to be actuated by said watthour meter element, means for returning said second movable member to its initial position when said second movable member has moved from its initial position a distance substantially equal to the instantaneous distance of said first-mentioned movable member from its initial position, and means for indicating the maximum movement of said second movable member.

19. A maximum demand indicator comprising in combination a watthour meter element and an indicating wattmeter element, a movable member having an initial position operatively connected to said indicating wattmeter element and adapted to always occupy a position whose distance from said initial position is a measure of the instantaneous rate of consumption of energy, a second movable member having an initial position and adapted to move in substantially the same path as the first-mentioned movable member, means actuated by the watthour meter element for moving said second movable member, means for returning said second movable member to its initial position when it engages with said first-mentioned movable member, and means for indicating the maximum movement of said second movable member.

20. A maximum demand indicator comprising in combination a watthour meter element and an indicating wattmeter element, a movable member having an initial position operatively connected to said indicating wattmeter element and adapted to always occupy a position whose distance from said initial position is a measure of the instantaneous rate of consumption of energy, a second movable member having an initial position, means for operatively connecting said watthour meter element to said second movable member, means for interrupting the operative connection between said watthour meter element and said second member when the distance the second member has moved from its initial position is substantially equal to the instantaneous distance of said first-mentioned member from its initial position, means for returning said second movable member to its initial position each time the operative connection between the watthour meter element and the second movable member is interrupted, and means for indicating the maximum movement of said second movable member.

21. A maximum demand indicator comprising in combination a watthour meter having a rotatable shaft, a movable member having an initial position, means for operatively connecting said rotatable shaft to said movable member, an electric circuit including an electromagnet, a movable armature for said electromagnet adapted by its movement to interrupt the operative connection between said rotatable shaft and said movable member, means for changing the electrical condition of the circuit when said member occupies a position with respect to a suitable reference scale which is a measure of the instantaneous rate of consumption of energy, means for returning said member to its initial position each time the operative connection between said shaft and said member is interrupted, and means for indicating the maximum movement of said movable member.

22. A maximum demand indicator comprising in combination a watthour meter element and an indicating wattmeter element, a movable member having an initial position operatively connected to said wattmeter element and adapted to always occupy a position whose distance from said initial position is a measure of the instantaneous rate of consumption of energy, a second movable member having an initial position, means for operatively connecting said watthour meter element to said second movable member, an electric circuit including an electromagnet, a movable armature for said electromagnet adapted by its movement to interrupt the operative connection between said watthour meter element and said second movable member, means for changing the electrical condition of the circuit when the distance the second member has moved from its initial position is a predetermined function of the instantaneous distance of said first-mentioned movable member from its initial position, means for returning said second movable member to its initial position each time the operative connection between said watthour meter element and said second movable member is interrupted, and means for indicating the maximum movement of the second movable member.

23. A maximum demand indicator comprising in combination a watthour meter having field coils and a rotatable armature, an indicating wattmeter armature pivotally mounted in the magnetic field of said coils, a control spring operatively connected to said wattmeter armature to render its movement a measure of the strength of the magnetic field, a movable member having an initial position, means actuated by said rotatable watthour meter armature for driving said movable member, means for returning said movable member to its initial position when the extent of its movement from its initial position is at any instant a predetermined function of the extent of movement of said indicating wattmeter armature from its initial position, and means for indicating the maximum movement of said movable member.

24. A maximum demand indicator comprising in combination a watthour meter having field coils and a rotatable armature, an indicating wattmeter armature pivotally mounted in the magnetic field of said coils, a control spring operatively connected to said wattmeter armature to render its movement a measure of the strength of the magnetic field, a movable member adapted to be actuated by the indicating wattmeter armature, a second movable member having an initial position and adapted to move in substantially the same path as the first-mentioned movable member, means actuated by said rotatable armature for moving said second movable member, means for returning said second movable member to its initial position when it engages with said first-mentioned movable member, and means for indicating the maximum movement of said second movable member.

25. A maximum demand indicator comprising in combination a watthour meter element and an indicating wattmeter element, an actuator having an initial position and adapted to be operatively connected to the watthour meter element, a movable member having an initial position operatively connected to said wattmeter element and adapted to always occupy a position whose distance from said initial position is a measure of the instantaneous rate of consumption of energy, means for interrupting the operative connection between the actuator and the watthour meter element when the distance the actuator has moved from its initial position is a predetermined function of the instantaneous distance of said indicating wattmeter element from its initial position, means for returning said actuator to its initial position when the operative connection between the actuator and the watthour meter element is interrupted, means for maintaining said actuator and said watthour meter element operatively disconnected until the actuator has returned to its initial position, and means for indicating the maximum movement of said actuator.

26. A maximum demand indicator comprising in combination a watthour meter element and an indicating wattmeter element, an actuator having an initial position and adapted to be operatively connected to the watthour meter element, an electric circuit including an electromagnet, a movable armature for said electromagnet, means operatively connected to said armature whereby a movement of the armature interrupts the operative connection between the actuator and the watthour meter element, movable contacts in said electric circuit, one of said movable contacts being operatively connected to said indicating wattmeter element and the other movable contact being operatively connected to the watthour meter element, means for returning said actuator to its initial position when the operative connection between the actuator and the watthour meter element is interrupted, and means for indicating the maximum movement of said actuator.

27. A maximum demand indicator comprising in combination a watthour meter having field coils and a rotatable armature, an indicating wattmeter armature pivotally mounted in the magnetic field of said coils, a control spring operatively connected to said indicating wattmeter armature to render its movement a measure of the strength of the magnetic field, an actuator having an initial position and adapted to be operatively connected to the watthour meter armature, an electric circuit including an electromagnet, a movable armature for said electromagnet, means operatively connected to said armature whereby a movement of the armature interrupts the operative connection between said actuator and said watthour meter armature, movable contacts in said electric circuit, one of said movable contacts being operatively connected to the indicating wattmeter armature and the other contact being operatively connected to the watthour meter armature, means for returning said actuator to its initial position when the operative connection between the actuator and the watthour meter armature is interrupted, and a non-return pointer adapted to be moved by said actuator.

28. A maximum demand indicator comprising in combination a watthour meter having field coils and a rotatable armature, an indicating wattmeter armature pivotally mounted in the magnetic field of said coils, a control spring operatively connected to said indicating wattmeter armature to render its movement a measure of the strength of the magnetic field, an actuator having an initial position and adapted to be operatively connected to said watthour meter armature, an electric circuit including an electromagnet, a movable armature for said electromagnet operatively connected to said actuator and adapted by its movement to interrupt the operative connection between the actuator and the watthour meter armature when the electromagnet is energized, a pair of coöperating movable contacts in said electric circuit, one of said contacts being operatively connected to said indicating wattmeter armature and the other contact being operatively connected to said watthour meter armature, a pair of coöperating auxiliary contacts, in shunt relation to said first mentioned contacts, means for returning said actuator to its initial position when said first-mentioned contacts engage with each other and the operative connection between said actuator and said watthour meter armature is interrupted, means for closing said auxiliary contacts when said first-mentioned contacts engage and for maintaining the auxiliary contacts closed until said actuator has returned to its initial position, and a non-return pointer adapted to be moved by said actuator.

In witness whereof, I have hereunto set my hand this 20th day of May 1913.

LEWIS T. ROBINSON.

Witnesses:
BENJAMIN B. HULL,
HELEN ORFORD.